United States Patent [19]
Kishi et al.

[11] Patent Number: 4,700,269
[45] Date of Patent: Oct. 13, 1987

[54] LOW TEMPERATURE SINTERED CERAMIC CAPACITOR WITH A TEMPERATURE COMPENSATING CAPABILITY, AND METHOD OF MANUFACTURE

[75] Inventors: Hiroshi Kishi, Fujioka; Minoru Oshio, Harunamachi; Shunji Murai, Harunamachi; Takeshi Wada, Harunamachi; Masami Fukui, Harunamachi, all of Japan

[73] Assignee: Taiyo Yuden Co., Ltd., Tokyo, Japan

[21] Appl. No.: 934,656

[22] Filed: Nov. 25, 1986

[30] Foreign Application Priority Data

Nov. 30, 1985 [JP] Japan .................................. 60-270540

[51] Int. Cl.$^4$ ........................ C04B 35/46; H01G 4/12
[52] U.S. Cl. ...................................... 361/321; 264/65
[58] Field of Search ................. 361/320, 321; 29/25, 29/42; 264/61, 65; 501/135

[56] References Cited

U.S. PATENT DOCUMENTS

| | | | |
|---|---|---|---|
| 4,223,369 | 9/1980 | Burn | 361/321 |
| 4,482,934 | 11/1984 | Hirota et al. | 361/321 |
| 4,616,289 | 10/1986 | Itakura et al. | 361/321 |
| 4,626,393 | 12/1986 | Wada et al. | 264/65 |
| 4,626,396 | 12/1986 | Wada et al. | 264/65 |

FOREIGN PATENT DOCUMENTS

53-98099  8/1978  Japan .

*Primary Examiner*—Donald A. Griffin
*Attorney, Agent, or Firm*—Woodcock Washburn Kurtz Mackiewicz & Norris

[57] ABSTRACT

A temperature compensating capacitor of monolithic, multilayered configuration comprising a dielectric ceramic body and at least two electrodes buried therein. The ceramic body is composed of a major ingredient expressed by the formula, $(CaO)_k \cdot (Zr_{1-x}Ti_x)O_2$, where k and x are numerals in the ranges of 0.8 to 1.3 inclusive and of zero to 0.3 inclusive, respectively. To this major ingredient is added a minor proportion of a mixture of lithium oxide, silicon dioxide, and one or more metal oxides selected from among barium oxide, magnesium oxide, zinc oxide, strontium oxide and calcium oxide. For the fabrication of capacitors the mixture of the above major ingredient and additives in finely divided form are formed into moldings of desired shape and size, each with at least two electrodes buried therein. The moldings and electrodes are cosintered in a reductive or neutral atmosphere and then are reheated at a lower temperature in an oxidative atmosphere. The cosintering temperature can be so low that nickel or like base metal can be employed as the electrode material.

9 Claims, 2 Drawing Figures

LOW TEMPERATURE SINTERED CERAMIC CAPACITOR WITH A TEMPERATURE COMPENSATING CAPABILITY, AND METHOD OF MANUFACTURE

BACKGROUND OF THE INVENTION

Our invention relates to solid dielectric capacitors, and more specifically to ceramic capacitors such as those of the monolithic, multilayered, configuration that are capable of manufacture by cosintering at sufficiently low temperatures to permit the use of base metal electrodes, and to a process for the fabrication of such low temperature sintered capacitors. The ceramic capacitors of our invention are particularly notable for their temperature compensating capability, having a practically constant temperature coefficient of capacitance in the normal range of temperatures in which they are intended for use.

Multilayered ceramic capacitors have been known which employ noble metals such as platinum and palladium as the electrode materials. Generally, for the manufacture of such multilayered capacitors, there are first prepared "green" (unsintered) dielectric sheets from the proportioned ingredients of a desired dielectric ceramic material in finely divided form. An electroconductive paste containing powdered platinum or palladium is then "printed" on the green sheets in a desired pattern. A plurality of such printed green sheets are stacked up, pressed together, and sintered in a temperature range of 1300° to 1600° C. in an oxidative atmosphere.

This conventional method makes possible the simultaneous production (cosintering) of the dielectric ceramic layers and the film electrodes interleaved therewith. It is also an acknowledged advantage of the known method that the nobel metal electrodes are totally unaffected by the high temperature sintering in an oxidative atmosphere. Offsetting all these advantages is the expensiveness of the noble metals, which add considerably to the costs of the multilayered ceramic capacitors.

Japanese Laid Open Patent Application No. 53-98099 suggests a solution to the above discussed problem, particularly in regard to the manufacture of temperature compensating ceramic capacitors. This patent application teaches ceramic compositions comprising calcium zirconate ($CaZrO_3$) and manganese dioxide ($MnO_2$). In the manufacture of ceramic capacitors the dielectric bodies of these known compositions are sinterable in a reductive atmosphere, so that electrodes of nickel or like base metal can be employed for cosintering with the dielectric bodies without the danger of oxidation.

We do, however, object to the prior art $CaZrO_3$-$MnO_2$ ceramic compositions for several reasons. These known ceramic compositions require firing in as high a temperature range as from 1350° to 1380° C. When the green sheets of the ceramic compositions, having a paste composed primarily of powdered nickel printed thereon, are sintered in that temperature range, the nickel particles tend to grow and flocculate in spite of the nonoxidative atmosphere in which they are fired. We have also found that the base metal particles are easy to diffuse into the ceramic bodies when fired in that temperature range. The flocculation and diffusion of the base metal particles are, of course, both undesirable as the resulting capacitors may fail to possess desired values of capacitance and insulation resistance.

SUMMARY OF THE INVENTION

We have hereby discovered how to reduce the firing temperature of ceramic bodies, particularly in the manufacture of temperature compensating capacitors by the cosintering of ceramic bodies and electrodes, to make possible the use of a low cost base metal as the electrode material without the noted difficulties encountered heretofore.

Stated briefly in one aspect thereof, our invention provides a low temperature sintered solid dielectric capacitor comprising a dielectric ceramic body and at least two electrodes in contact therewith. The dielectric ceramic body consists essentially of 100 parts by weight of $(CaO)_k \cdot (Zr_{1-x}Ti_x)O_2$, where k is a numeral in the range of 0.8 to 1.3 inclusive, and x a numeral in the range of zero to 0.3 inclusive, and 0.2 and 10.0 parts by weight of an additive mixture of lithium oxide ($Li_2O$), silicon dioxide ($SiO_2$), and at least one metal oxide selected from the group consisting of barium oxide (BaO), magnesium oxide (MgO), zinc oxide (ZnO), strontium oxide (SrO) and calcium oxide (CaO). The relative proportions of $Li_2O$, $SiO_2$ and at least one selected metal oxide, altogether constituting the additive mixture, will be specifically determined in connection with a ternary diagram attached hereto.

The subscript x in the above defined formula of the major ingredient may be zero in accordance with our invention. Thus the major ingredient may also be expressed as $(CaO)_k \cdot (Me)O_2$, where Me is either Zr or (Zr+Ti).

The ceramic capacitor of our invention, having its dielectric body formulated as set forth in the foregoing, has proved to be very well suited for temperature compensating applications in oscillator and other circuits. The test capacitors manufactured in accordance with out invention had specific dielectric constants of over 30 at one megahertz (MHz), temperature coefficients of capacitances of +40 to −800 ppm per degree C., Q factors of over 2000 at 1 MHz, and resistivities of $1 \times 10$ megohm-centimeters. The Q factors rises to as much as 5000 or more if the dielectric body contains from 0.2 to 5.0 parts by weight of the additive mixture with respect to 100 parts of the major ingredients.

Another aspect of our invention is a method of fabricating the above defined ceramic capacitor. The method dictates, first of all, the preparation of of a mixture of the above indicated proportions of the major ingredient and additives in finely divided form. This mixture is then molded into a body of desired shape and size, which is provided with at least two electrode portions of an electroconductive material in any convenient manner. Then the molding with the electrode portions is sintered in a nonoxidative (i.e. reductive or neutral) atmosphere and is subsequently reheated in an oxidative atmosphere.

We recommend a temperature range of 1000° to 1200° C. for sintering the dielectric molding. This temperature range is sufficiently low to permit the cosintering, in a nonoxidative atmosphere, of nickel or like base metal as the electrodes on the dielectric molding without the likelihood of the flocculation or diffusion of the base metal.

The above and other features and advantages of our invention and the manner of realizing them will become more apparent, and the invention itself will best be understood, from a study of the following description and appended claims taken together with the attached drawings.

DETAILED DESCRIPTION

Figure 1:
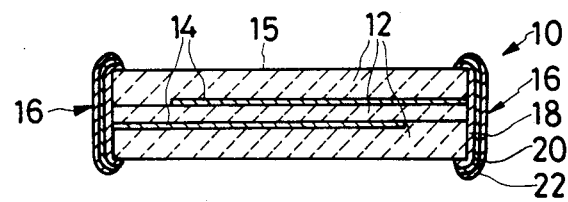
FIG. 1 is a sectional representation of a monolithic, multilayered ceramic capacitor in accordance with our invention, the illustrated capacitor being representative of numerous test capacitors fabricated in the Examples of our invention to be presented subsequently.

We have illustrated in FIG. 1 one of many like monolithic ceramic capacitors fabricated in the subsequent Examples of our invention by way of a preferable embodiment thereof. Generally designated 10, the representative capacitor is shown to have an interlamination of three dielectric ceramic layers 12 and two film electrodes 14. The three ceramic layers 12 constitute in combination a solid dielectric body 15 having the low temperature sintered ceramic compositions in accordance with our invention. The two film electrodes 14, which can be of a low cost base metal such as nickel, extend from the opposite sides of the dielectric body 15 toward, and terminate short of, the other sides of the dielectric body and so have an overlapping, parallel spaced relation to each other. A pair of conductive terminations 16 contact the respective film electrodes 14. Each termination 16 is shown to comprise a baked on zinc layer 18, a plated on copper layer 20, and a plated on solder layer 22.

Typically, and as fabricated in the subsequent Examples of our invention, the intermediate one of the three dielectric layers 12 has a thickness of 0.02 millimeter. The area of that part of each film electrode 14 which overlaps the other film electrode is 25 square millimeters (5×5 millimeters).

EXAMPLES

We fabricated 61 different sets of test capacitors, each constructed as in FIG. 1, some having their dielectric bodies formulated in accordance with the ceramic compositions of our invention and others not, and measured their electrical properties. Table 1 lists the compositions of the dielectric bodies of all the test capacitors fabricated.

The major ingredient of the ceramic compositions in accordance with our invention has been herein defined as $(CaO)_k \cdot (Zr_{1-x}Ti_x)O_2$, or $(CaO)_k \cdot (Me)O_2$, where Me is either Zr or (Zr+Ti). Accordingly, in Table 1, we have given various combinations of the atomic numbers k and x in the formula to indicate the specific major ingredients employed in the various Examples. The ceramic compositions of our invention further include mixtures, in various proportions, of additives $Li_2O$, $SiO_2$ and MO. Table 1 specifies the amounts, in parts by weight, of the additive mixtures with respect to 100 parts by weight of the major ingredient, as well as the relative proportions, in mole percent, of the additives $Li_2O$, $SiO_2$ and MO. Further, since MO can be any one or more of BaO, MgO, ZnO, SrO and CaO, Table 1 gives the relative proportions, in mole percent, of these metal oxides, wherever one or more of them are employed.

TABLE 1

| | Major Ingredient (100 wt. parts) | | Additives Amount | Composition (mole %) | | | MO (mole %) | | | | |
|---|---|---|---|---|---|---|---|---|---|---|---|
| Test No. | k | x | (wt. part) | $Li_2O$ | $SiO_2$ | MO | BaO | MgO | ZnO | SrO | CaO |
| 1 | 1.0 | 0.02 | 3.0 | 5 | 50 | 45 | 20 | 20 | 20 | 20 | 20 |
| 2 | " | " | " | 0 | 60 | 40 | " | " | " | " | " |
| 3 | " | " | " | 0 | 65 | 35 | " | " | " | " | " |
| 4 | " | " | " | 50 | 50 | 0 | — | — | — | — | — |
| 5 | " | " | " | 25 | 75 | 0 | — | — | — | — | — |
| 6 | " | " | " | 15 | 80 | 5 | 20 | 20 | 20 | 20 | 20 |
| 7 | " | " | " | 5 | 75 | 20 | " | " | " | " | " |
| 8 | " | " | " | 0 | 50 | 50 | " | " | " | " | " |
| 9 | " | " | " | 10 | 40 | 50 | " | " | " | " | " |
| 10 | " | " | " | 40 | 40 | 20 | " | " | " | " | " |
| 11 | 1.0 | 0.02 | 3.0 | 25 | 60 | 15 | 100 | — | — | — | — |
| 12 | " | " | " | " | " | " | — | 100 | — | — | — |
| 13 | " | " | " | " | " | " | — | — | 100 | — | — |
| 14 | " | " | " | " | " | " | — | — | — | 100 | — |
| 15 | " | " | " | " | " | " | — | — | — | — | 100 |
| 16 | " | " | " | " | " | " | 20 | 20 | 20 | 20 | 20 |
| 17 | " | " | " | 10 | 55 | 35 | 20 | 40 | 20 | 20 | — |
| 18 | " | " | " | 25 | 50 | 25 | 20 | 10 | 30 | 10 | 30 |
| 19 | " | " | " | 35 | 55 | 10 | — | 10 | 50 | 40 | — |
| 20 | " | " | " | 35 | 65 | — | — | — | — | — | — |
| 21 | 1.0 | 0.02 | 3.0 | 15 | 70 | 15 | 30 | — | — | 20 | 50 |
| 22 | 1.1 | 0 | " | " | 60 | 25 | 20 | 20 | 20 | 20 | 20 |
| 23 | " | 0.01 | " | " | " | " | " | " | " | " | " |
| 24 | " | 0.03 | " | " | " | " | " | " | " | " | " |
| 25 | " | 0.05 | " | " | " | " | " | " | " | " | " |
| 26 | " | 0.10 | " | " | " | " | " | " | " | " | " |
| 27 | " | 0.15 | " | " | " | " | " | " | " | " | " |
| 28 | " | 0.20 | " | " | " | " | " | " | " | " | " |
| 29 | " | 0.25 | " | " | " | " | " | " | " | " | " |
| 30 | " | 0.30 | " | " | " | " | " | " | " | " | " |
| 31 | 1.1 | 0.35 | 3.0 | 15 | 60 | 25 | 20 | 20 | 20 | 20 | 20 |
| 32 | " | 0.40 | " | " | " | " | " | " | " | " | " |
| 33 | 1.0 | 0.01 | 0 | 25 | 70 | 5 | " | " | " | " | " |
| 34 | " | " | 0.2 | " | " | " | " | " | " | " | " |
| 35 | " | " | 1.0 | " | " | " | " | " | " | " | " |

TABLE 1-continued

| | Major Ingredient (100 wt. parts) | | Ceramic Compositions Additives | | | | | | | | |
|---|---|---|---|---|---|---|---|---|---|---|---|
| | | | Amount | Composition (mole %) | | | MO (mole %) | | | | |
| Test No. | k | x | (wt. part) | $Li_2O$ | $SiO_2$ | MO | BaO | MgO | ZnO | SrO | CaO |
| 36 | " | " | 5.0 | " | " | " | " | " | " | " | " |
| 37 | " | " | 7.0 | " | " | " | " | " | " | " | " |
| 38 | " | " | 10.0 | " | " | " | " | " | " | " | " |
| 39 | " | " | 12.0 | " | " | " | " | " | " | " | " |
| 40 | " | 0.05 | 0 | 5 | 65 | 30 | " | " | " | " | " |
| 41 | 1.0 | 0.05 | 0.2 | 5 | 65 | 30 | 20 | 20 | 20 | 20 | 20 |
| 42 | " | " | 5.0 | " | " | " | " | " | " | " | " |
| 43 | " | " | 10.0 | " | " | " | " | " | " | " | " |
| 44 | " | " | 12.0 | " | " | " | " | " | " | " | " |
| 45 | " | 0.25 | 0 | 40 | 50 | 10 | " | " | " | " | " |
| 46 | " | " | 0.2 | " | " | " | " | " | " | " | " |
| 47 | " | " | 5.0 | " | " | " | " | " | " | " | " |
| 48 | " | " | 10.0 | " | " | " | " | " | " | " | " |
| 49 | " | " | 12.0 | " | " | " | " | " | " | " | " |
| 50 | 0.7 | 0.02 | 3.0 | 35 | 60 | 5 | " | " | " | " | " |
| 51 | 0.8 | 0.02 | 3.0 | 35 | 60 | 5 | 20 | 20 | 20 | 20 | 20 |
| 52 | 1.0 | " | " | " | " | " | " | " | " | " | " |
| 53 | 1.2 | " | " | " | " | " | " | " | " | " | " |
| 54 | 1.3 | " | " | " | " | " | " | " | " | " | " |
| 55 | 1.4 | " | " | " | " | " | " | " | " | " | " |
| 56 | 0.7 | 0.20 | 5.0 | 5 | 55 | 40 | " | " | " | " | " |
| 57 | 0.8 | " | " | " | " | " | " | " | " | " | " |
| 58 | 1.0 | " | " | " | " | " | " | " | " | " | " |
| 59 | 1.2 | " | " | " | " | " | " | " | " | " | " |
| 60 | 1.3 | " | " | " | " | " | " | " | " | " | " |
| 61 | 1.4 | " | " | " | " | " | " | " | " | " | " |

According to Table 1, the major ingredient of the dielectric bodies of the capacitors of Test No. 1 was $CaO.(Zr_{0.98}Ti_{0.02})O_2$. One hundred parts of this major ingredient was admixed with 3.0 parts by weight of a mixture of five mole percent $Li_2O$, 50 mole percent $SiO_2$ and 45 mole percent MO. MO was a mixture of 20 mole percent BaO, 20 mole percent MgO, 20 mole percent ZnO, 20 mole percent SrO and 20 mole percent CaO.

For the fabrication of the capacitors of Test No. 1 we started with the preparation of the major ingredient of their dielectric bodies. We prepared the following start materials:

Calcium carbonate ($CaCO_3$): 541.14 grams (1.00 mole part)

Zirconium oxide ($ZrO_2$): 650.23 grams (0.98 mole part)

Titanium oxide ($TiO_2$): 8.62 grams (0.02 mole part).

These start materials had all purities of not less than 99.0 percent. The above specified weights of the start materials do not include those of the impurities contained. We charged the start materials into a pot mill together with alumina balls and 2.5 liters of water and mixed them together for 15 hours. Then the mixture was introduced into a stainless steel vat and therein dried by air heated to 150° C. for hours. Then the dried mixture was crushed into relatively coarse particles, which were subsequently fired in air within a tunnel furnace at 1200° C. for two hours. There was thus obtained the major ingredient of the above specified composition in finely divided form.

For the provision of the additives of Test No. 1 we prepared:

$Li_2O$: 1.78 grams (five mole percent)

SiO: 35.75 grams (50 mole percent)

$BaCO_3$: 21.14 grams (nine mole percent)

MgO: 4.32 grams (nine mole percent)

ZnO: 8.71 grams (nine mole percent)

$SrCO_3$: 15.81 grams (nine mole percent)

$CaCO_3$: 10.72 grams (nine mole percent ).

To these substances we added 300 cubic centimeters of alcohol, and the resulting slurry was stirred for 10 hours in a polyethylene pot with alumina balls. Then the mixture was air fired at 1000° C. for two hours. Then, charged into an alumina pot together with 100 cubic centimeters of water, the fired mixture was pulverized with alumina balls over a period of 15 hours. Then the pulverized mixture was dried at 150° C. for four hours. There was thus obtained in finely divided form the desired additive mixture of five mole percent $Li_2O$, 50 mole percent $SiO_2$ and 45 mole percent MO, with the MO consisting of nine mole percent BaO, nine mole percent MgO, nine mole percent ZnO, nine mole percent SrO and nine mole percent CaO.

Thirty grams (three weight percent) of this additive mixture was added to 1000 grams of the above prepared major ingredient. Further, to this mixture, we added 15 percent by weight of an organic binder and 50 percent by weight of water with respect to the total weight of the major ingredient and additives. The organic binder was an aqueous solution of acrylic ester polymer, glycerine, and condensed phosphate. The mixture of all these was ball milled into a slurry. Then this slurry was defoamed in vacuum.

Then the defoamed slurry was charged into a reverse roll coater thereby to be shaped into a thin, continuous strip on an elongate supporting strip of polyester film. Then the strip was dried by heating to 100° C. on the supporting film. The green ceramic strip thus obtained, approximately 25 microns thick, was subsequently punched into "squares" sized 10 by 10 centimeters. These green ceramic squares are to become the ceramic layers 12, FIG. 1, in the completed test capacitors 10.

For the fabrication of the base metal film electrodes 14 on the ceramic layers 12, we prepared 10 grams of nickel in finely divided form, with an average particle size of 1.5 microns, and a solution of 0.9 gram of ethyl cellulose in 9.1 grams of butyl "Carbitol" (trademark for diethylene glycol monobutyl ether). Both were intimately interminged by being agitated for 10 hours, thereby providing an electroconductive paste. Then this paste was "printed" on one surface of each green ceramic square, which had been prepared as above described, through a screen having 50 perforations of rectangular shape, each sized seven by 14 millimeters.

After drying the printed paste, two green squares were stacked, with their printings directed upwardly, and with the printings on the two squares offset from each other to an extent approximately half the pitch of their patterns in the longitudinal direction. The thus stacked two printed squares were placed between two separate stacks of unprinted squares each with a thickness of 60 microns. The resulting stack of printed and unprinted squares were pressed in their thickness direction under a pressure of approximately 40 tons at 50° C., thereby firmly bonding the stacked squares to one another. Then the bonded squares were cut in a latticed pattern into 50 laminate chips of identical construction.

We employed a furnace capable of atmosphere control for cofiring the above prepared green dielectric bodies and, buried therein, the conductive layers which were to become the film electrodes 14 in the completed capacitors 10. The chips were first air heated in this furnace to 600° C. at a rate of 100° C. per hour, thereby driving off the organic binder that had been used for providing the slurry of the powdered major ingredient and adddsitives. Then the furnace atmosphere was changed from air to a reductive (nonoxidative) atmosphere consisting of two percent by volume of molecular hydrogen and 98 percent by volume of molecular nitrogen. In this reductive atmosphere the furnace temperature was raised from 600° C. to 1130° C. at a rate of 100° C. per hour. The maximum temperature of 1130° C., at which the ceramic bodies formulated in accordance with our invention were to be sintered to maturity, was maintained for three hours. Then the furnace temperature was lowered to 600° C. at a rate of 100° C. per hour. Then, with the furnace atmosphere again changed to air (oxidative atmosphere), the temperature of 600° C. was maintained for 30 minutes for the oxidizing heat treatment of the sintered chips. Then the furnace temperature was allowed to drop to room temperature.

There were thus obtained the dielectric ceramic bodies 15, FIG. 1 cosintered with the film electrodes 14 buried therein.

We proceeded to the production of the pair of conductive terminations 16 on both sides of each ceramic body 15 through which are exposed the film electrodes 14. First, for the production of the inmost zinc layers 18, a conductive paste composed of zinc, glass frit and vehicle was coated on both sides of each ceramic body 15. The coatings on drying were air heated to 550° C. and maintained at that temperature for 15 minutes, thereby completing the zinc layers 18 each in direct contact with one of the two film electrodes 14. Then the intermediate copper layers 20 were formed over the zinc layers 18 by electroless plating. Then the outermost solder layers 22 were formed by electroplating a lead tin alloy over the copper layers 20.

We have thus completed the fabrication of monolithic, multilayered ceramic test capacitors, each constructed as in FIG. 1, in accordance with the ceramic composition of Test No. 1 of Table 1. The composition of the ceramic bodies 15 of the thus completed capacitors proved substantially akin to that before sintering. It is therefore reasoned that the sintered ceramic bodies 15 are of perovskite structures, with the additives (five mole percent $Li_2O$, 50 mole percent $SiO_2$, nine mole percent $BaO$, nine mole percent $MgO$, nine mole percent $ZnO$, nine mole percent $SrO$ and nine mole percent $CaO$) uniformly dispersed among the crystal grains of the major ingredient.

As far the other ceramic compositions of Table 1, designated Tests Nos. 2 through 61, we made similar capacitors through exactly the same procedure as that set forth in the foregoing in connection the Test No. 1 composition, except for the temperature of sintering in the reductive atmosphere, which will be referred to presently.

All the capacitors of Test Nos. 1 through 61 were then tested as to their specific dielectric constants, temperature coefficients, Q factors, and resistivities. The following are the methods we employed for the measurement of these properties:

Specific Dielectric Constant

The capacitance of each test capacitor was first measured at a temperature of 20° C., a frequency of one megahertz, and an effective alternating current voltage of 0.5 volt. Then the specific dielectric constant was computed from the measured value of capacitance, the urea (25 square millimeters) of each of the overlapping parts of the two film electrodes 14, and the thickness (0.05 millimeter) of that ceramic layer 12 which intervenes between the film electrodes.

Temperature Coefficient of Capacitance

The capacitance $C_{85}$ at 85 C. and capacitance $C_{20}$ at 20° C. of each test capacitor were first measured. Then the temperature coefficient TC of capacitance was computed by the equation $$TC = \frac{C_{85} - C_{20}}{C_{20}} \times \frac{1}{65} \times 10^6 \text{ (ppm/°C.)}.$$

Q FACTOR

The Q factor was measured by a Q meter at a frequency of one megahertz, a temperature of 20° C., and an effective alternating current voltage of 0.5 volt.

RESISTIVITY

Resistance between the pair of conductive terminations 16 of each test capacitor was measured after the application of a direct current voltage of 50 volts for one minute at a temperature of 20° C. Then the resistivity was computed from the measured resistance value and the size of the test capacitors.

Table 2 gives the results of the measurements by the above described methods, as well as the maximum temperatures at which the test capacitors were sintered in the reductive atmosphere during their manufacture. It will be noted from this table that the specific dielectric constants of the Test No. 1 capacitors, for instance, averaged 33, their temperature coefficients −20 ppm per degree C., their Q factors 8000, and their resistivities $1.8 \times 10^7$ megohm-centimeters. The temperature coefficients of the capacitances of the test capacitors were practically constant in the normal range of their operating temperatures, making the capacitors well suited for use as temperature compensating capacitors.

TABLE 2

Sintering Temperature & Capacitor Characteristics

| Test No. | Sintering Temp. (°C.) | Specific Dielectric Constant | Temperature Coefficient (ppm/°C.) | Q Factor | Resistivity (megohm-cm) |
|---|---|---|---|---|---|
| 1 | 1130 | 33 | −20 | 8000 | $1.8 \times 10^7$ |
| 2 | 1140 | 33 | −15 | 7300 | $2.5 \times 10^7$ |
| 3 | 1130 | 33 | −15 | 7500 | $2.2 \times 10^7$ |
| 4 | 1110 | 33 | −10 | 7800 | $1.5 \times 10^7$ |
| 5 | 1110 | 33 | −10 | 7800 | $2.1 \times 10^7$ |
| 6 | 1250 | Not coherently bonded on firing. | | | |
| 7 | " | " | | | |
| 8 | " | " | | | |
| 9 | " | " | | | |
| 10 | " | " | | | |
| 11 | 1110 | 33 | −20 | 8800 | $2.3 \times 10^7$ |
| 12 | " | " | " | 8500 | $1.9 \times 10^7$ |
| 13 | " | " | " | 8600 | $1.8 \times 10^7$ |
| 14 | " | " | −15 | 8700 | $2.4 \times 10^7$ |
| 15 | " | " | " | 8400 | " |
| 16 | " | " | " | 8800 | $2.2 \times 10^7$ |
| 17 | " | " | −10 | 8700 | $2.3 \times 10^7$ |
| 18 | " | " | " | 8600 | $2.0 \times 10^7$ |
| 19 | " | " | −15 | 8200 | $1.7 \times 10^7$ |
| 20 | " | " | " | " | $1.5 \times 10^7$ |
| 21 | 1110 | 33 | −10 | 8800 | $2.1 \times 10^7$ |
| 22 | 1130 | 30 | +40 | 7800 | $2.8 \times 10^7$ |
| 23 | 1120 | 32 | +10 | 8200 | $2.6 \times 10^7$ |
| 24 | " | 34 | −40 | 8400 | $2.7 \times 10^7$ |
| 25 | 1110 | 35 | −100 | 8300 | " |
| 26 | " | 41 | −220 | 8600 | $2.3 \times 10^7$ |
| 27 | " | 49 | −330 | 8200 | $2.2 \times 10^7$ |
| 28 | " | 52 | −450 | 8400 | $2.0 \times 10^7$ |
| 29 | " | 59 | −580 | 7900 | " |
| 30 | " | 66 | −730 | 7800 | " |
| 31 | 1110 | 73 | −860 | 7600 | $1.4 \times 10^7$ |
| 32 | " | 80 | −950 | " | $1.2 \times 10^7$ |
| 33 | 1300 | Not coherently bonded on firing. | | | |
| 34 | 1170 | 32 | 0 | 8300 | $2.5 \times 10^7$ |
| 35 | 1150 | " | −10 | 8200 | $2.2 \times 10^7$ |
| 36 | 1100 | " | −20 | 8400 | $2.0 \times 10^7$ |
| 37 | 1070 | 31 | " | 6600 | $1.3 \times 10^7$ |
| 38 | " | 30 | " | 3500 | $1.0 \times 10^7$ |
| 39 | 1050 | " | −25 | 1060 | $8.5 \times 10^7$ |
| 40 | 1300 | Not coherently bonded on firing. | | | |
| 41 | 1170 | 36 | −80 | 8200 | $3.1 \times 10^7$ |
| 42 | 1080 | 35 | −110 | 8800 | $3.0 \times 10^7$ |
| 43 | 1060 | " | −120 | 3400 | $1.8 \times 10^7$ |
| 44 | " | 33 | −140 | 850 | $7.2 \times 10^6$ |
| 45 | 1300 | Not coherently bonded on firing. | | | |
| 46 | 1170 | 62 | −550 | 6800 | $2.0 \times 10^7$ |
| 47 | 1080 | 60 | −580 | 5900 | $1.5 \times 10^7$ |
| 48 | 1050 | 59 | −590 | 3200 | $1.1 \times 10^7$ |
| 49 | 1020 | 53 | −620 | 1250 | $4.2 \times 10^6$ |
| 50 | 1100 | 35 | −20 | 45 | $7.6 \times 10^3$ |
| 51 | 1110 | 34 | −20 | 6800 | $1.3 \times 10^7$ |
| 52 | " | 33 | −10 | 8300 | $1.6 \times 10^7$ |
| 53 | 1130 | " | −20 | 8100 | $1.8 \times 10^7$ |
| 54 | 1170 | 31 | −30 | 4100 | $1.1 \times 10^7$ |
| 55 | 1300 | Not coherently bonded on firing. | | | |
| 56 | 1080 | 54 | −460 | 80 | $2.5 \times 10^3$ |
| 57 | 1100 | 53 | −440 | 8200 | $1.1 \times 10^7$ |
| 58 | " | " | −430 | 8400 | $2.3 \times 10^7$ |
| 59 | 1130 | 52 | −460 | 7100 | $2.5 \times 10^7$ |
| 60 | 1170 | 50 | −510 | 4300 | $1.0 \times 10^7$ |
| 61 | 1300 | Not coherently bonded on firing. | | | |

It will be observed from Table 2 that the dielectric bodies of Tests Nos. 6, 7, 8, 9, 10, 33, 40, 45, 55 and 61 were not coherently bonded on firing at temperatures as high as 1250° or 1300° C. in the reductive atmosphere. The corresponding ceramic compositions of Table 1 fall outside the scope of our invention. The dielectric bodies of all the other Tests could be sintered to maturity at temperatures less than 1200° C.

Before proceeding further with the examination of the results of Table 2 we will determine the acceptable criteria of the four electrical properties in question for the temperature compensating ceramic capacitors provided by our invention. The criteria are:

Specific dielectric constant: From 30 to 66.
Temperature coefficient of capacitance: From −730 to +40 ppm per degree C.
Q factor: Not less than 3000.
Resistivity:
Not less than $1 \times 10^7$ megohm-centimeters.

A reconsideration of Table 1 in light of the above established criteria of favorable electrical characteristics will reveal that the capacitors of Tests Nos. 31, 32, 39, 44, 49, 50 and 56 do not meet these criteria. Accordingly, the corresponding ceramic compositions of Table 1 also fall outside the scope of our invention. All the test capacitors but those of Tests Nos. 6–10, 31–33, 39, 40, 44, 45, 49, 50, 55, 56 and 61 satisfy the criteria, so that their ceramic compositions are in accord with our invention.

Now, let us study the ceramic compositions of Table 1 and the corresponding capacitor characteristics, as well as the sintering temperatures, of Table 2 in more detail. The ceramic compositions of Tests Nos. 33, 40 and 45 contained no additive specified by our invention. The dielectric bodies formulated accordingly were not coherently bonded on firing at a temperature as high as 1300° C. Consider the ceramic compositions of Tests Nos. 34, 41 and 46 for comparison. They contained 0.2 part by weight of the additives with respect to 100 parts by weight of the major ingredient. Even though the firing temperature was as low as 1170° C., the resulting test capacitors possess the desired electrical characteristics. We set, therefore, the lower limit of the possible proportions of the additive mixture at 0.2 part by weight with respect to 100 parts by weight of the major ingredient.

The Tests Nos. 39, 44 and 49 ceramic compositions contained as much as 12 parts by weight of the additives with respect to 100 parts by weight of the major ingredient. The resulting Tests Nos. 39, 44 and 49 capacitors have average Q factors of 1060, 850 and 1250, respectively, which are all far less than the above established criterion of 3000. When the proportion of the additive mixture was reduced to 10 parts by weight, as in Tests Nos. 38, 43 and 48, the resulting capacitors have all the desired characteristics. Therefore, the upper limit of the possible proportions of the additive mixture is set at 10 parts by weight with respect to 100 parts by weight of the major ingredient.

As for the major ingredient, $(CaO)_k \cdot (Zr_{1-x}Ti_x)O_2$, and 32. In the resulting capacitors the temperature coefficient of capacitance is −860 and −950, both outside the desired range of −800 to +40. When the value of x was decreased to not more than 0.30, as in Tests Nos. 23 through 30, then the desired electrical characteristics were all obtained. The highest possible value of x is therefore 0.30. Test No. 22 indicates that the desired electrical characteristics are obtainable if the value of x is zero, that is, if the major ingredient does not include titanium. The Q factor becomes relatively high if the value of x is reduced to 0.25 or less.

The value of k in the formula of the major ingredient was set at 0.7 in Tests Nos. 50 and 56. The resistivities of the resulting capacitors were $7.6 \times 10^3$ and $2.5 \times 10^3$, both much lower than the desired lower limit of $1 \times 10$. The desired value of resistivity was obtained when the value of k was increased to 0.8 as in Test No. 57. The lowermost possible value of k is therefore 0.8. On the other hand, when the value of k was made as much as 1.4 as in Tests Nos. 55 and 61, the resulting dielectric bodies were not coherently bonded on firing at as high a temperature as 1300° C. The desired electrical characteristics were obtained when the value of k was reduced to 1.3 as in Tests Nos. 54 and 60. Accordingly, the greatest possible value of k is 1.3.

Figure 2:
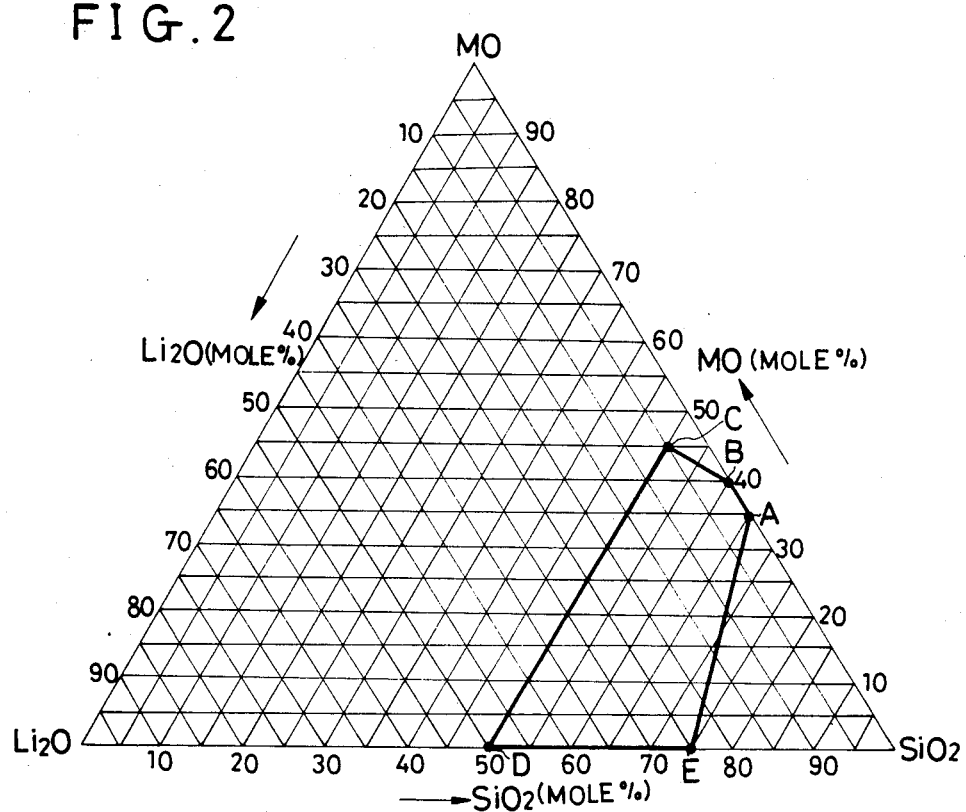
FIG. 2 is a ternary diagram depicting the relative proportions of the additives of the ceramic compositions in accordance with our invention.

We have ascertained from the results of Table 2 that the acceptable range of the relative proportions of $Li_2O$, $SiO_2$ and MO, the additives of the ceramic compositions in accordance with our invention, can be definitely stated in reference to the ternary diagram of FIG. 2.

The point A in the ternary diagram indicates the Test No. 3 additive composition of zero mole percent $Li_2O$, 65 mole percent $SiO_2$ and 35 mole percent MO. The point B indicates the Test No. 2 additive composition of zero mole percent $Li_2O$, 60 mole percent $SiO_2$ and 40 mole percent Mo. The point C indicates the Test No. 1 additive composition of five mole percent $Li_2O$, 50 mole percent $SiO_2$ and 45 mole percent MO. The point D indicates the Test No. 4 additive composition of 50 mole percent $Li_2O$, 50 mole percent $SiO_2$ and zero mole percent MO. The point E indicates the Test No. 5 additive composition of 25 mole percent $Li_2O$, 75 mole percent $SiO_2$ and zero mole percent MO.

The relative proportions of the additives $Li_2O$, $SiO_2$ and MO of the ceramic compositions in accordance with our invention are within the region bounded by the lines sequentially connecting the above stated points A, B, C, D and E in the ternary diagram of FIG. 2.

Tables 1 and 2 prove that the additive compositions within the above defined region makes possible the provision of capacitors of the desired electrical characteristics. The additive compositions of Tests Nos. 6–10 all fall outside that region, and the corresponding dielectric bodies were not coherently bonded on firing at a temperature of 1250° C. The above specified acceptable range of the relative proportions of the additives holds true regardless of whether only one of BaO, MgO, ZnO, SrO and CaO is employed as MO, as in Tests Nos. 11–15, or two or more or all of them are employed in suitable relative proportions as in other Tests.

Although we have disclosed our invention in terms of specific Examples thereof, we understand that our invention is not to be limited by the exact details of such disclosure but admits of a variety of modifications or alterations within the usual knowledge of the ceramists, chemists or electricians without departing from the scope of the invention. The following, then, is a brief list of such possible modifications or alterations:

1. The low temperature sinterable ceramic compositions of our invention may include various additives not disclosed herein. An example is a mineralizer such as manganese dioxide. Used in a proportion (preferably from 0.05 to 0.10 percent by weight) not adversely affecting the desired characteristics of the resulting capacitors, such a mineralizer will lead to the improvement of sinterability.

2. The start materials of the major ingredients of the ceramic compositions in accordance with our invention may be substances other than those employed in the foregoing Examples, examples being oxides such as CaO, hydroxyides, etc.

3. The start materials of the additives may also be substances such as oxides and hydroxides other than those disclosed herein.

4. The temperature of the oxidizing heat treatment need not necessarily be 600° C. but can be variously determined in a range (from 500° to 1000° C. for the best results) not exceeding the temperature of the preceding sintering in a nonoxidative atmosphere, the oxidizing temperature being dependent upon factors such as the particular base metal electrode material in use and the degree of oxidation required for the ceramic material.

5. The temperature of cosintering in a nonoxidative atmosphere may also be changed in consideration of the particular electrode material in use. We recommend a range of 1050° to 1200° C. if the electrode material is nickel, as we have ascertained from experiment that little or no flocculation of the nickel particles takes place in that temperature range.

6. The dielectric bodies and electrodes may be cosintered in a neutral, instead of reductive, atmosphere.

7. The ceramic compositions disclosed herein may be employed for capacitors other than those of the multilayered configuration.

We claim:

1. A low temperature sintered solid dielectric capacitor comprising a dielectric ceramic body and at least two electrodes in contact therewith, the dielectric ceramic body consisting essentially of:

100 parts by weight of a major ingredient expressed by the formula,

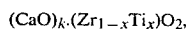

$(CaO)_k \cdot (Zr_{1-x}Ti_x)O_2,$ where
k is a numeral in the range of 0.8 to 1.3 inclusive; and
x is a numeral in the range of zero to 0.3 inclusive; and from 0.2 to 10.0 parts by weight of an additive mixture of lithium oxide, silicon dioxide and at least one metal oxide selected from the group consisting of barium oxide, magnesium oxide, zinc oxide, strontium oxide and calcium oxide, the relative proportions of lithium oxide, silicon dioxide and at least one selected metal oxide constituting the additive mixture being in that region of the ternary diagram of FIG. 2 attached hereto which is bounded by the lines sequentially connecting:

the point A where the additive mixture consists of zero mole percent lithium oxide, 65 mole percent silicon dioxide, and 35 mole percent metal oxide;

the point B where the additive mixture consists of zero mole percent lithium oxide, 60 mole percent silicon dioxide, and 40 mole percent metal oxide;

the point C where the additive mixture consists of five mole percent lithium oxide, 50 mole percent silicon dioxide, and 45 mole percent metal oxide;

the point D where the additive mixture consists of 50 mole percent lithium oxide, 50 mole percent silicon dioxide, and zero mole percent metal oxide; and the point E where the additive mixture consists of 25 mole percent lithium oxide, 75 mole percent silicon dioxide, and zero mole percent metal oxide.

2. A low temperature sintered solid dielectric capacitor as set forth in claim 1, wherein the electrodes are buried in the dielectric ceramic body.

3. A low temperature sintered solid dielectric capacitor as set forth in claim 1, wherein the electrodes are of a base metal.

4. A low temperature sintered solid dielectric capacitor as set forth in claim 3, wherein the base metal is nickel.

5. A process for the manufacture of a low temperature sintered solid dielectric capacitor, which process comprises:

providing a mixture of:
100 parts by weight of a major ingredient, in finely divided form, that is expressed by the formula, $$(CaO)_k \cdot (Zr_{1-x}Ti_x)O_2,$$

where
k is a numeral in the range of 0.8 to 1.3 inclusive; and
x is a numeral in the range of zero to 0.3 inclusive; and from 0.2 to 10.0 parts by weight of an additive mixture, in finely divided form, of lithium oxide, silicon dioxide and at least one metal oxide selected from the group consisting of barium oxide, magnesium oxide, zinc oxide, strontium oxide and calcium oxide, the relative proportions of lithium oxide, silicon dioxide and at least one selected metal oxide constituting the additive mixture being in that region of the ternary diagram of FIG. 2 attached hereto which is bounded by the lines sequentially connecting:

the point a where the additive mixture consists of zero mole percent lithium oxide, 65 mole percent silicon dioxide, and 35 mole percent metal oxide;

the point B where the additive mixture consists of zero mole percent lithium oxide, 60 mole percent silicon dioxide, and 40 mole percent metal oxide;

the point C where the additive mixture consists of five mole percent lithium oxide, 50 mole percent silicon dioxide, and 45 mole percent metal oxide;

the point D where the additive mixture consists of 50 mole percent lithium oxide, 50 mole percent silicon dioxide, and zero mole percent metal oxide; and the point E where the additive mixture consists of 25 mole percent lithium oxide, 75 mole percent silicon dioxide, and zero mole percent metal oxide;

molding the mixture into desired shape and size, the molding having at least two electrode portions of an electroconductive material;

cosintering the molding and the electrode portions to maturity in a nonoxidative atmosphere; and reheating the cosintered molding and electrode portions in an oxidative atmosphere.

6. A process for the manufacture of a low temperature sintered solid dielectric capacitor as set forth in claim 5, wherein the electrode portions are formed on the molding by coating the same with an electroconductive paste composed principally of a base metal.

7. A process for the manufacture of a low temperature sintered solid dielectric capacitor as set forth in claim 6, wherein the base metal is nickel.

8. A process for the manufacture of a low temperature sintered solid dielectric capacitor as set forth in claim 5, wherein the molding and the electrode portions are cosintered to maturity in a temperature range of 1000° to 1200° C.

9. A process for the manufacture of a low temperature sintered solid dielectric capacitor as set forth in claim 5, wherein the cosintered molding and electrode portions are reheated in a temperature range of 500° to 1000° C.

* * * * *

UNITED STATES PATENT AND TRADEMARK OFFICE
CERTIFICATE OF CORRECTION

PATENT NO. : 4,700,269
DATED : Oct. 13, 1987
INVENTOR(S) : Kishi et al.

It is certified that error appears in the above-identified patent and that said Letters Patent is hereby corrected as shown below:

Column 1, line 10, remove comma "," before the word "configuration".

Column 2, line 43, change "factors" to --factor--.

Column 7, line 28, delete one "d" from the word "addditives".

Column 8, line 27, change spelling of "urea" to --area--.

Column 10, line 17, change "out" to --our--.

Column 10, line 49, following line 49, insert --the value of $\underline{x}$ was set at 0.35 and 0.40 in Tests Nos. 31--.

Column 10, line 64, change "1 x 10", to --1 x $10^7$--.

Column 11, line 65, change spelling of "hydroxyides" to --hydroxides--.

Column 13, line 29, change third word "a" to a capital --A--.

Signed and Sealed this

Twenty-seventh Day of September, 1988

Attest:

DONALD J. QUIGG

*Attesting Officer*      *Commissioner of Patents and Trademarks*